US009441596B2

(12) United States Patent
Bleyer et al.

(10) Patent No.: US 9,441,596 B2
(45) Date of Patent: Sep. 13, 2016

(54) VALVE FOR FUEL SUPPLY SYSTEM

(71) Applicant: Caterpillar Motoren GmbH & Co. KG, Kiel (DE)

(72) Inventors: Benjamin Bleyer, Kiel (DE); Erik Sydow, Altenholz (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 14/718,698

(22) Filed: May 21, 2015

(65) Prior Publication Data
US 2015/0354520 A1  Dec. 10, 2015

(30) Foreign Application Priority Data

Jun. 4, 2014 (EP) .................................. 14171139

(51) Int. Cl.
*F02M 63/00* (2006.01)
*F16K 1/34* (2006.01)
(Continued)

(52) U.S. Cl.
CPC ........ *F02M 63/0031* (2013.01); *F02D 19/025* (2013.01); *F02D 19/029* (2013.01); *F02D 19/0621* (2013.01); *F02M 21/0242* (2013.01); *F02M 63/0015* (2013.01); *F02M 63/0077* (2013.01); *F16K 1/34* (2013.01); *F16K 31/0655* (2013.01); *F02D 19/10* (2013.01);
(Continued)

(58) Field of Classification Search
CPC .................... F02M 63/0031; F02M 63/0015; F02M 63/0077; F02M 21/0242; F02D 19/0621; F02D 19/029; F02D 19/025; F02D 19/10; Y02T 10/36; Y02T 10/32; F16K 31/0655; F16K 1/34; Y10T 137/5907
See application file for complete search history.

(56) References Cited

U.S. PATENT DOCUMENTS

| 2009/0127848 A1* | 5/2009 | Carns ..................... F16L 23/003 285/55 |
| 2014/0283788 A1* | 9/2014 | Bleyer ..................... F02D 41/22 123/445 |
| 2015/0129076 A1* | 5/2015 | Snodgrass .......... F02M 37/0017 138/109 |

FOREIGN PATENT DOCUMENTS

DE  10 2008 015 611 A   10/2009
DE  10 2013 006 301 A1  10/2014
(Continued)

OTHER PUBLICATIONS

European Search Report for Application EP 14 17 1139 dated Nov. 13, 2014 (2 pages).

*Primary Examiner* — Hieu T Vo
*Assistant Examiner* — Sherman Manley
(74) *Attorney, Agent, or Firm* — Finnegan, Henderson, Farabow, Garrett & Dunner, LLP

(57) ABSTRACT

A valve for a fuel supply of an internal combustion engine is disclosed. The valve may have a valve housing that defines a channel in fluid communication with an inert gas supply line at a first end of the valve housing. The valve housing may also have a first flange disposed at a second end distal to the first end. The valve may have a valve body that selectively allow the channel of the valve housing to communicate with an inner bore of a double-walled connecting element of the fuel supply system. The valve housing may also have a second flange disposed adjacent to the first flange. The first flange and the second flange define a detection gap therebetween. The second flange may have a passage in fluid communication with a detection space of the double-walled connecting element and the detection gap.

20 Claims, 3 Drawing Sheets

(51) Int. Cl.
*F16K 31/06* (2006.01)
*F02M 21/02* (2006.01)
*F02D 19/02* (2006.01)
*F02D 19/06* (2006.01)
*F02D 19/10* (2006.01)

(52) U.S. Cl.
CPC ................ *Y02T 10/32* (2013.01); *Y02T 10/36* (2013.01); *Y10T 137/5907* (2015.04)

(56) References Cited

FOREIGN PATENT DOCUMENTS

EP          1 150 006 A2    10/2001
WO    WO 2013/064200 A1    5/2013

\* cited by examiner

VALVE FOR FUEL SUPPLY SYSTEM

CLAIM FOR PRIORITY

This application claims benefit of priority of European Patent Application No. 14171139.0, filed Jun. 4, 2014, which is incorporated herein by reference

TECHNICAL FIELD

The present disclosure relates to a gaseous or dual fuel engine, and more particularly to a valve for a fuel supply system of the engine.

BACKGROUND

A fuel supply system of a gaseous fuel internal combustion engine includes multiple components including, but not limited to, double-walled connecting elements, double-walled fuel supply line elements and valves. The double-walled fuel supply line elements and connecting elements include an inner line element for receiving a gaseous fuel therethrough. As the gaseous fuel flows through the inner line element, there may be possibilities that the gaseous fuel leak out through the inner line element. To prevent the gaseous fuel from spreading to the ambient atmosphere, an outer line element is provided around the inner line element. The outer line element and the inner line element define a fuel leak detection space to receive the gaseous fuel coming out of the inner line element. Moreover, the fuel supply system is provided with a valve that is fluidly communicated between an inert gas supply line and the double-walled fuel supply line elements. The valve is configured to selectively purge the whole fuel supply system with an inert gas.

The valve also includes an inner body for selectively communicating between the inert gas supply line and the double-walled fuel supply line elements. An outer body is disposed around the inner body to define a fuel leak detection space. The leak detection space of the valve further communicates with the leak detection space of the fuel supply system. However, designing and manufacturing such double-walled valve is complex.

SUMMARY OF THE DISCLOSURE

In one aspect of the present disclosure, a valve for a fuel supply system of an internal combustion engine is disclosed. The valve may include a valve housing that defines a channel therethrough. The channel may be in fluid communication with an inert gas supply line at a first end of the valve housing. The valve housing further may include a first flange disposed at a second end thereof. The second end is being distal to the first end of the valve housing. A valve body is movably disposed within the channel of the valve housing. The valve body may be configured to selectively allow the channel of the valve housing to communicate with an inner bore of a double-walled connecting element of the fuel supply system. A second flange is disposed adjacent to the first flange. The first flange and the second flange may be coupled to the double-walled connecting element. The second flange may include a passage therethrough in fluid communication with a detection space of the double-walled connecting element. The first flange and the second flange may define a detection gap therebetween. The detection gap may be fluidly communicated with the passage of the second flange.

In another aspect of the present disclosure, a gaseous or a dual fuel internal combustion engine is disclosed. The internal combustion engine may include a cylinder and a fuel inlet valve. The fuel inlet valve is configured to supply a gaseous fuel to the cylinder. The internal combustion engine further may include a fuel supply system. The fuel supply system may include a double-walled fuel supply line element having an outer line element and an inner line element. The inner line element is enclosed within the outer line element and configured to receive the gaseous fuel. A double-walled connecting element may be disposed adjacent to the double-walled fuel supply line element. The double-walled connecting element may include an inner bore in fluid communication with the inner line element of the double-walled fuel supply line element. The inner bore is further in fluid communication with the fuel inlet valve. The outer line element of the double-walled fuel supply line element may be fluidly communicated with a detection space of the double-walled connecting element. The detection space is further fluidly communicated with an inert gas supply line.

The fuel supply system further may include a valve. The valve may include a valve housing that defines a channel therethrough in fluid communication with an inert gas supply line at a first end of the valve housing. The valve housing further may include a first flange disposed at a second end thereof. The second end is being distal to the first end of the valve housing. A valve body is movably disposed within the channel of the valve housing. The valve body may be configured to selectively allow the channel of the valve housing to communicate with an inner bore of a double-walled connecting element of the fuel supply system. A second flange is disposed adjacent to the first flange. The first flange and the second flange may be coupled to the double-walled connecting element. The second flange may include a passage therethrough in fluid communication with the detection space of the double-walled connecting element. The first flange and the second flange may define a detection gap therebetween. The detection gap may be fluidly communicated with the passage of the second flange.

In an embodiment of the present disclosure, the first flange includes an axial portion extending into the inner bore of the double-walled connecting element. The axial portion may be at least partly received within a central opening of the second flange. The detection gap may radially extend from an outer surface of the axial portion to the passage of the second flange. A first sealing member may be provided between the first flange and the second flange radially outwards of the passage of the second flange. A second sealing member may be provided between the outer surface of the axial portion and the second flange. A third sealing member may be provided between the second flange and a wall element of the double-walled connecting element. The valve body may be normally biased to prevent fluid communication between the channel of the valve housing and the inner bore of the double-walled connecting element.

In another embodiment of the present disclosure, a fastener may be configured to pass through corresponding holes of the first flange and the second flange to couple the first flange and the second flange to the double-walled connecting element.

In yet another embodiment of the present disclosure, a solenoid may be disposed around the valve housing. The solenoid is being selectively activated to move the valve body in order to allow the channel of the valve housing to fluidly communicate with the inner bore of the double-walled connecting element.

Other features and aspects of this disclosure will be apparent from the following description and the accompanying drawings.

DETAILED DESCRIPTION

Figure 1:
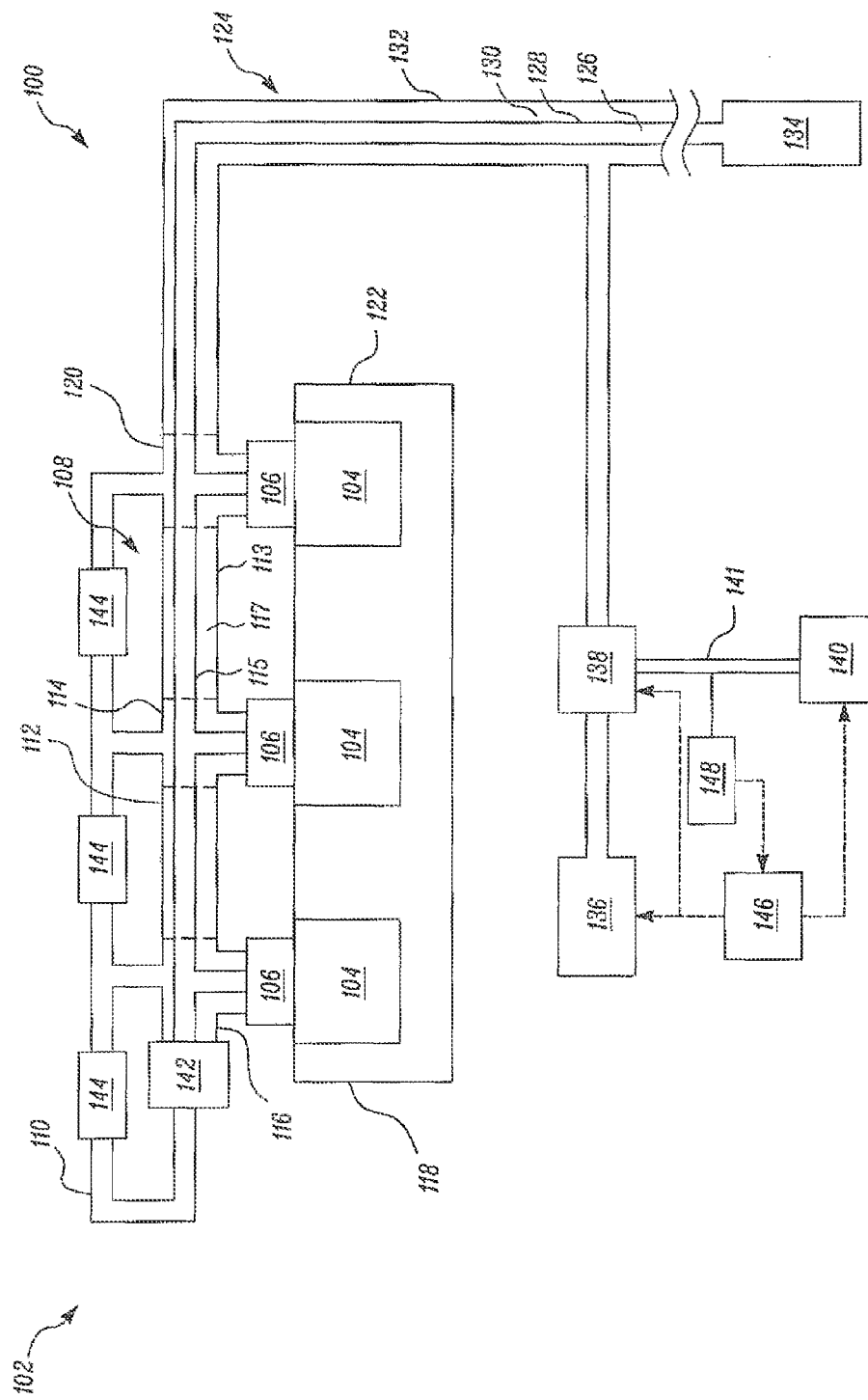
FIG. 1 is a block diagram illustrating a fuel supply system of an internal combustion engine, according to an embodiment of the present disclosure.

FIG. 1 illustrates a block diagram of a fuel supply system 100 associated with an internal combustion engine 102. The engine 102 is a gaseous or a dual fuel internal combustion engine. The duel fuel internal combustion engine may include a first fuel that may be, for example, gasoline or diesel, and a second fuel that may be, for example, LPG, CNG or hydrogen. In various embodiments, the engine 102 may include a single cylinder or a plurality of cylinders. The plurality of cylinders may be in various configurations such as, for example, inline, V-type, etc.

The fuel supply system 100 may be fluidly coupled with the internal combustion engine 102 to selectively supply the first fuel and the second fuel. The term "fuel" in general may be hereinafter used for any kind of gaseous fuel as well as for any kind of liquid fuel.

In the embodiment of FIG. 1, the engine 102 may include three cylinders 104. However, it is contemplated that the engine 102 of the present disclosure may include any number of cylinders. Each of the cylinders 104 may be associated with a fuel inlet valve 106. The fuel inlet valve 106 is provided on top of the cylinder 104 to selectively supply the fuel to the cylinder 104. Further, the fuel inlet valve 106 is fluidly coupled with the fuel supply system 100 for receiving the fuel therefrom. The fuel supply system 100 may include a fuel line 108 and an inert gas supply line 110. The fuel line 108 includes a plurality of double-walled fuel supply elements 112 and a plurality of double-walled connecting elements 114. The double-walled connecting element 114 is fluidly connected to the fuel inlet valve 106 of each of the cylinders 104. The double-walled connecting element 114 may be removably connected to the fuel inlet valve 106 via fastening members such as a stud or a nut and bolt arrangement. Further, the double-walled fuel supply element 112 is fluidly connected between two double-walled connecting elements 114. The double-walled supply element 112 includes an outer line element 113 and an inner line element 115. The outer line element 113 is provided around the inner line element 115 to define a space 117. The inner line element 115 is configured to receive the fuel therethrough. The double-walled fuel supply element 112 may be connected to the double-walled connecting element 112 via fastening members such as a stud or a nut and bolt arrangement. As such, the fuel line 108 defines a single continuous fuel line for receiving the fuel therethrough and for supplying the fuel to each of the cylinders 104 via the double-walled connecting element 114 and the fuel inlet valve 106.

The fuel line 108 of the fuel supply system 100 defines a first end 116 at a first longitudinal end 118 of the internal combustion engine 102. The first end 116 of the fuel line 108 may be a free opening of the double-walled connecting element 114 associated with the cylinder 104 adjacent to the first longitudinal end 118 of the engine 102. The fuel line 108 further defines a second end 120 at a second longitudinal end 122 of the engine 102. The second end 120 of the fuel line 108 may be a free opening of the double-walled connecting element 114 associated with the cylinder 104 adjacent to the second longitudinal end 122 of the engine 102. The second end 120 of the fuel line 108 may be further fluidly connected to a double-walled fuel supply line 124. The double-walled fuel supply line 124 may include a first passage 126 defined by an inner wall 128 and a second passage 130 defined between the inner wall 128 and an outer wall 132. The first passage 126 may be fluidly connected to a fuel reservoir 134, for example, a gaseous fuel reservoir, for receiving the fuel therethrough and supplying to the cylinder 104 of the engine 102. The second passage 130 may be fluidly connected to an inert gas supply system 136 for receiving the inert gas therethrough and communicating with the fuel line 108. The inert gas supply system 136 may be electrically communicated with a controller 146 to receive a control signal therefrom. Upon receipt of the control signal, the inert gas supply system 136 may start supplying inert gas to the fuel line 108. The inert gas supply system 136 is further fluidly connected to a change-over valve 138 that selectively supply the inert gas to the fuel line 108. The change-over valve 138 may be disposed on the outer wall 132 of the double-walled fuel supply line 124 to communicate with the second passage 130. The change-over valve 138 may be an electrically actuated valve and may be communicated with the controller 146 to receive control signal therefrom. Upon receipt of the control signal, the change-over valve 138 may allow inert gas from the inert gas supply system 136 to the fuel line 108. A suction device 140 may be fluidly connected to the change over valve 138 a fluid passage 141. The suction device 140 is configured to create a negative pressure via vacuum or continuous flow in the inert gas supply line 110.

The first end 116 of the fuel line 108 is fluidly connected to a valve 142. The valve 142 is further fluidly communicated with the inert gas supply line 110. The inert gas supply line 110 is further fluidly connected with each of the double-walled connecting elements 114. The valve 142 is configured to selectively supply an inert gas to the fuel line 108 from the inert gas supply line 110. The inert gas supply line 110 may be further fluidly communicated to the inert gas supply system 136 via the second passage 130 of the double-walled fuel supply line 124. A plurality of control valves 144 may be disposed in the inert gas supply line 110. One of the plurality of control valves 144 may be disposed in the inert gas supply line 110 that is fluidly communicated between two double-walled connecting elements 114 adjacent to each other. In an embodiment, the control valve 144 may include an actuator (not shown) that may be electrically actuated via the controller 146. Each of the plurality of control valves 144 may be selectively actuated upon receipt of control signal from the controller 146. The controller 146 may send control signal based on a detection of the leakage of gaseous fuel at a particular location in fuel line 108.

A sensor 148 may be fluidly connected to the fluid passage 141. The sensor 148 may be a gas content sensor configured to detect gas content in the inert gas supply line 110. The sensor 148 may be further communicated with the controller 146 to determine leakage of gaseous fuel in the inert gas supply line 110.

In operation of gaseous fuel leak detection, the suction device 140 creates the negative pressure to suck air from the inert gas supply line 110 towards the sensor 148. If the sensor 148 senses a predetermined concentration of, for example, gaseous fuel in case of a leakage, the change-over valve 138 may be actuated by the controller 146 to fluidly communicate the inert gas supply system 136 to the inert gas supply line 110 for filling the inert gas supply line 110 with the inert gas. Further, in case the engine is a dual fuel type, the fuel line 108 may be flushed of gaseous fuel with the inert gas when the engine switches from gaseous fuel operation to liquid fuel operation or stops from gaseous fuel operation.

Figure 2:
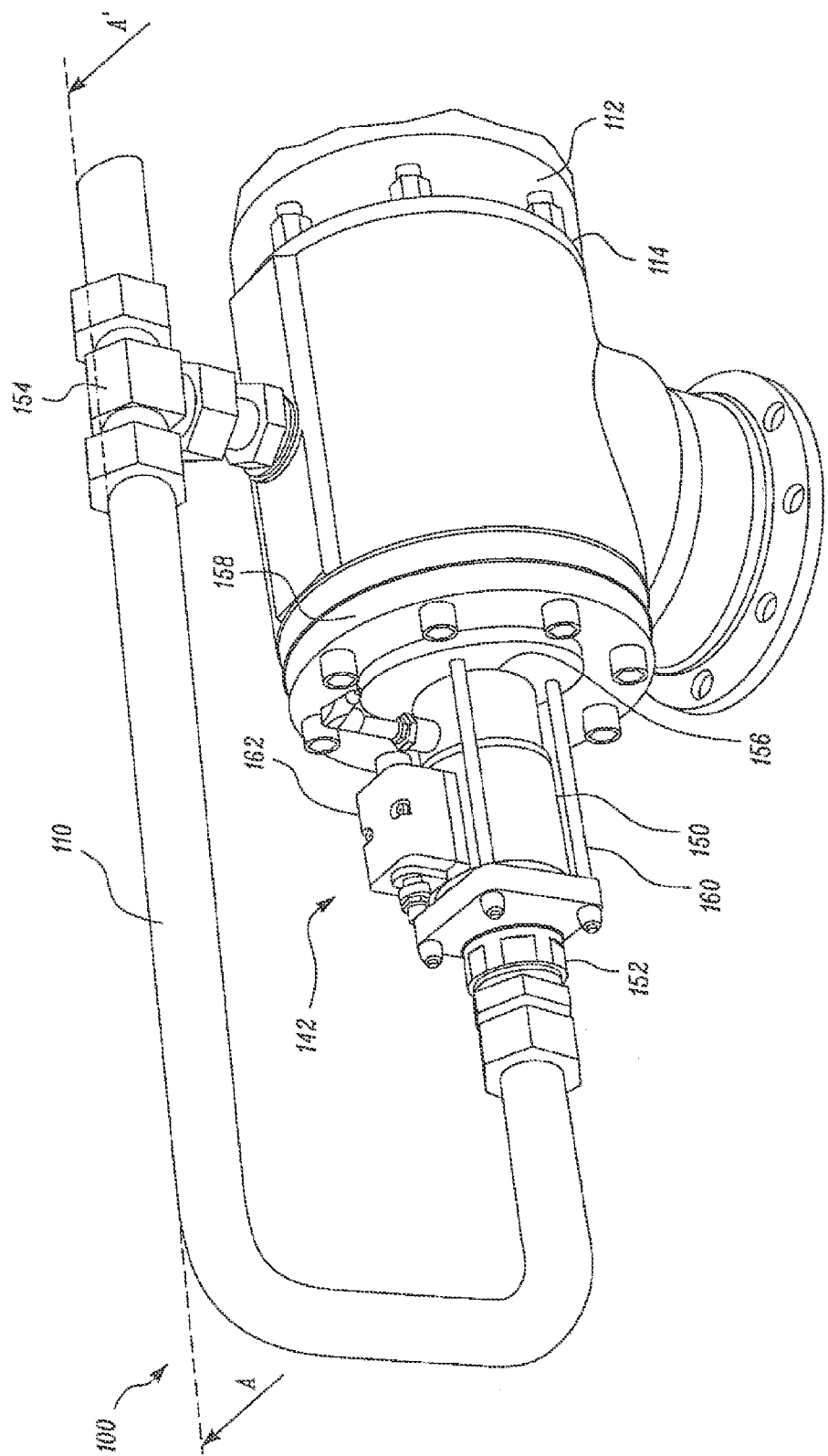
FIG. 2 is a perspective view of a valve assembled with the fuel supply system, according to an embodiment of the present disclosure.

FIG. 2 shows a perspective view of the valve 142 assembled with the fuel supply system 100, according to an embodiment of the present disclosure. The valve 142 includes a valve housing 150 defining a first end 152. The first end 152 is removably connected with the inert gas supply line 110. The inert gas supply line 110 may be threadingly connected to the first end 152 via a nut. However, the inert gas supply line 110 may be connected to the first end 152 of the valve 142 by any alternative methods, for example, press fitting. The inert gas supply line 110 is fluidly connected to each of the double-walled connecting element 114 via a coupling member 154. The valve housing 150 of the valve 142 further defines a second end 156. The second end 156 is provided with a first flange 158. The first flange 158 may be removably attached with the valve housing 150 of the valve 142 via fasteners 160, such as bolts, as shown in FIG. 2. The valve 142 further includes a solenoid 162 that may be disposed on the valve housing 150 to electrically communicate with the controller 146 (shown in FIG. 1).

Figure 3:
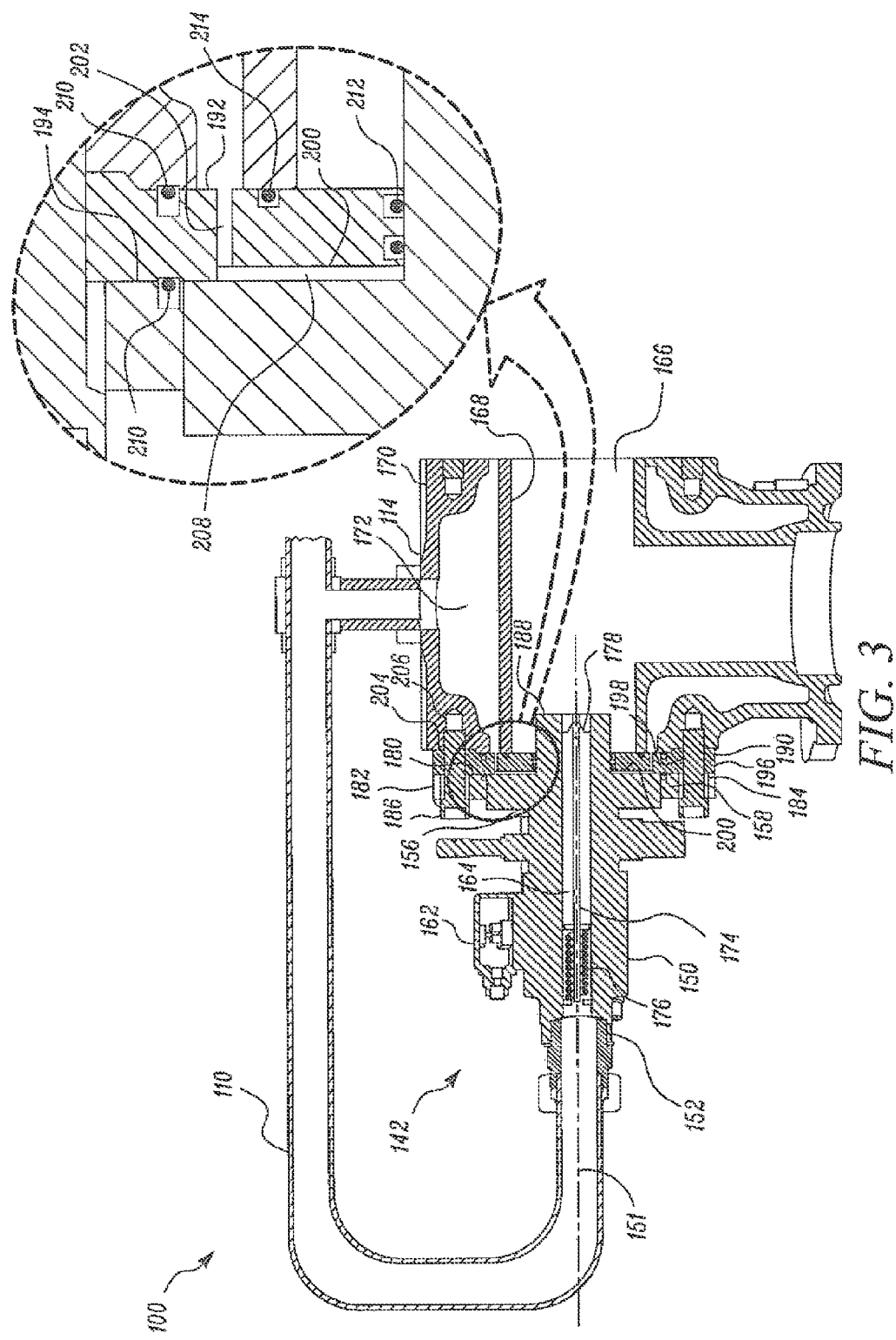
FIG. 3 is a sectional view of the valve assembled with the fuel supply system taken along line A-A' of FIG. 2.

FIG. 3 shows a sectional view of the valve 142 assembled with the fuel supply system 100 taken along line A-A' of FIG. 2. The valve housing 150 defines a channel 164 extending therethrough along a longitudinal axis 151. The channel 164 is fluidly communicated with the inert gas supply line 110 at the first end 152 of the valve housing 150. Further, the channel 164 is fluidly communicated with an inner bore 166 of the double-walled connecting element 114. The inner bore 166 of the double-walled connecting element 114 is defined by an inner wall element 168. The inner bore 166 is further fluidly communicated with the inner line element 115 of double-walled fuel supply line element 112. The double-walled connecting element 114 further includes an outer wall element 170 around the inner wall element 168. The outer wall element 170 and the inner wall element 168 together define a detection space 172. The detection space 172 is configured within the double-walled connecting element 114 to receive the gaseous fuel that may be leaked out of the inner bore 166. The detection space 172 is further fluidly communicated with the space 117 defined by the outer line element 113 of double-walled fuel supply line element 112.

The valve 142 further includes a valve body 174 that is movably disposed within the channel 164. The valve body 174 may be biased by a spring member 176 against a valve seat 178 within the channel 164. Thus, the spring member 176 may ensure that the valve body 174 is normally biased to a closed position. The valve body 174 may be further operatively coupled with the solenoid 162. The solenoid 162 may actuate the valve body 174 against the biasing of the spring member 176 based on input received from the controller 146 (shown in FIG. 1) to selectively allow the channel 164 of the valve housing 150 to communicate with the inner bore 166 of the double-walled connecting element 114.

The first flange 158 disposed adjacent to the second end 156 of the valve housing 150 defines a surface 180 in a plane perpendicular to the longitudinal axis 151 of the valve housing 150. A plurality of holes 184 is provided adjacent to the outer circumference 182 of the first flange 158. The holes 184 are configured to receive a fastener 186 therethrough. The fastener 186 may be, for example, a bolt or a stud. The first flange 158 further includes an axial portion 188 that extends from the surface 180 thereof along the central axis of the valve housing 150. Further, the axial portion 188 extends into the inner bore 166 of the double-walled connecting element 114.

The valve 142 includes a second flange 190 disposed adjacent to the first flange 158. The second flange 190 defines a first surface 192 facing the double-walled connecting element 114 and a second surface 194 facing the first flange 158. The second flange 190 further defines an outer circumference 196 that may radially align with the outer circumference 182 of the first flange 158. A plurality of holes 198 is provided adjacent to the outer circumference 196 of the second flange 190 corresponding to the plurality of holes 184 of the first flange 158. The holes 184 of the first flange 158 and the holes 198 of the second flange 190 are axially aligned with each other. The second flange 190 includes a central opening extending along the central axis of the valve housing 150. A recess 200 may be provided on the second surface 194 of the second flange 190 radially around the central opening. The recess 200 may be radially extended to a plurality of passages 202 that is spaced apart from the central opening.

The double-walled connecting element 114 includes a surface 204 in conformance to the first surface 192 of the second flange 190 to abut therewith. The surface 204 of the double-walled connecting element 114 is further provided with plurality of holes 206 corresponding to the holes of the first and the second flange 158, 190. The holes of the first flange 158, the second flange 190 and the double-walled connecting element 114 are aligned each other to receive the fastener 186 therethrough.

As shown in FIG. 3, the axial portion 188 of the first flange 158 is partly received within the central opening of the second flange 190. Further, the first flange 158 and the second flange 190 are coupled to the double-walled connecting element 114 via the fasteners 186 passing through the holes 184, 198 defined therebetween. The first surface 192 of the second flange 190 abuts the surface 204 of the double-walled connecting element 114 and the second surface 194 of the second flange 190 abuts the surface 180 of the first flange 158. A detection gap 208 is defined between the surface 180 of the first flange 158 and the recess 200 of the second flange 190. Thus, the passage 202 is fluidly communicated with the detection gap 208 and the detection space 172. In an alternative embodiment, the detection gap 208 may radially extend from the axial portion 188 of the first flange 158 to the passage 202 by providing a recess (not shown) on the surface 180 of the first flange 158. In a further embodiment, both the first and second flanges 158, 190 may include complementary recesses (not shown). In various other embodiments, the detection gap 208 defined between the first flange 158 and the second flange 190 may be various shapes and dimensions in order to fluidly communicate with the passage 202.

Further, a first sealing member 210 is provided between the first flange 158 and the second flange 190 radially outward of the passage 202. The first sealing member 210 may have an annular body with a circular cross-section. The first sealing member 210 is disposed within a groove provided on the surface 180 of the first flange 158. The first sealing member 210 may further abut the second surface 194 of the second flange 190 to provide a fluid-tight sealing between the first flange 158 and the second flange 190.

However, in other embodiments, the first sealing member 210 may have any other cross-section, for example, square, oval, and the like. The first sealing member 210 may also be disposed within a groove on the second surface 194 of the second flange 190 to abut with the surface 180 of the first flange 158 to provide a fluid-tight seal. Another of the first sealing member 210 may be disposed between the second flange 190 and the outer wall element 170 of the doubled walled connecting element 114 radially outward of the passage 202. In various embodiments, the first sealing member 210 may be disposed either in the first surface 192 of the second flange to abut with the surface 204 of the outer wall element 170 or in the surface 204 of the outer wall element 170 to abut with the first 192 of the second flange 190.

A second sealing member 212 is provided between the second flange 190 and an outer surface of the axial portion 188. The second sealing member 212 may be disposed on the second flange 190 and abuts the outer surface of the axial portion 188. In other embodiments, the second sealing member 212 may be disposed within a groove of the outer surface of the axial portion 188 and abuts the central opening of the second flange 190. A third sealing member 214 is disposed between the second flange 190 and the inner wall element 168 of the double-walled connecting element 114. In various embodiments, the third sealing member 214 may be disposed either within a groove of the first surface 192 of the second flange 190 to abuts the surface 204 of the inner wall element 168 or within a groove of the surface 204 of the inner wall element 168 to abut the first surface 192 of the second flange 190.

INDUSTRIAL APPLICABILITY

A fuel supply system of a gaseous fuel or a dual fuel internal combustion engine includes a fuel line that is formed by a plurality of double-walled fuel supply elements. The double-walled fuel supply element is further coupled with cylinder of the engine via a double-walled connecting element. Thus, a double-walled fuel line is fluidly communicated between the cylinders and a gaseous fuel reservoir to supply gaseous fuel to the cylinders. The fuel supply system further includes an inert gas supply line that is fluidly coupled with the fuel line via a double-walled valve. The inert gas supply line is further communicated with an inert gas reservoir for supplying an inert gas to the fuel supply system. The double-walled valve is configured to purge the fuel line with the inert gas. The valve with an inner wall for communicating the fuel line with the inert gas supply line and an outer wall around the inner wall to define a space to receive the gaseous fuel that leaks out from the inner wall is complex design.

The present disclosure relates to the valve 142 having the valve housing 150 fluidly communicated between the fuel line 108 and the inert gas supply line 110. As shown in FIG. 3, the second flange 190 is partly received within the axial portion 188 of the first flange 158 through the central opening. The first flange 158 along with the second flange 190 is coupled to the double-walled connecting element 114 via the fasteners 186 passing through the holes 184, 192 defined therebetween. The detection gap 208 is defined between the first flange 158 and the second flange 190 is fluidly communicated with the detection space 172 through the passage 202. The first sealing member 210 is provided between the first flange 158 and the second flange 190 and another of the first sealing member 210 is disposed between the second flange 190 and the double-walled connecting element 114. The second sealing member 212 is provided between the second flange 190 and the outer surface of the axial portion 188 and the third sealing member 214 is disposed between the second flange 190 and the inner wall element 168 of the double-walled connecting element 114. Thus, the second flange 190 fluid tightly disposed between the first flange 158 of the valve 142 and the double-walled connecting element 114 gives the same benefit that is generally provided by the known double-walled valve. In addition, as the valve housing 150 of the valve 142 is made with only a single wall, complexity with respect to design and manufacturing thereof may be reduced as compared to a double-walled valve known in the prior art. Further, electrical components, such as the solenoid 162 is mounted outside of the valve housing 150, and therefore isolated from the gaseous fuel. This may ensure that the valve 142 is not required to meet statutory regulations regarding placement of electrical components within an inflammable environment.

In the operation, the gaseous fuel may leak out of the inner wall element 168 due to various reasons, for example, damages in the second and third sealing members 212, 214. The leaked gaseous fuel may flow into the detection gap 208 and subsequently, into the passage 202. Thereafter, the leaked gaseous fuel may flow into the detection space 172. As the detection space 172 is fluidly communicated with the inert gas supply line 110, the sensor 148 that is communicated with the inert gas supply line 110 detects the gas content in the inert gas supply line 110. Further, if the gaseous fuel leaks out through the valve seat 178 into the channel 164, the sensor 148 senses the gas content as the channel 164 is fluidly communicated with the inert gas supply line 110. Therefore, the single-walled design of the valve 142 may be able to provide detection of any leakage of gaseous fuel.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A valve for a fuel supply system of an internal combustion engine, the valve comprising:
   a valve housing defining a channel therethrough in fluid communication with an inert gas supply line at a first end of the valve housing, the valve housing further comprising a first flange disposed at a second end thereof, the second end being distal to the first end;
   a valve body movably disposed within the channel of the valve housing, the valve body configured to selectively allow the channel of the valve housing to communicate with an inner bore of a double-walled connecting element of the fuel supply system; and
   a second flange disposed adjacent to the first flange, wherein the first flange and the second flange are coupled to the double-walled connecting element, and wherein the second flange comprises a passage therethrough in fluid communication with a detection space of the double-walled connecting element;
   wherein the first flange and the second flange define a detection gap therebetween, and wherein the passage of the second flange is in fluid communication with the detection gap.

2. The valve of claim 1, wherein the first flange further comprises an axial portion extending into the inner bore of the double-walled connecting element, and wherein the axial portion is at least partly received within a central opening of the second flange.

3. The valve of claim 2, wherein the detection gap radially extends from an outer surface of the axial portion to the passage of the second flange.

4. The valve of claim 2, further comprising a first sealing member provided between the first flange and the second flange radially outwards of the passage of the second flange.

5. The valve of claim 2, further comprising a second sealing member provided between the outer surface of the axial portion and the second flange.

6. The valve of claim 2, further comprising a third sealing member between the second flange and an inner wall element of the double-walled connecting element.

7. The valve of claim 1, further comprising a fastener configured to pass through corresponding holes of the first flange and second flange to couple the first flange and the second flange to the double-walled connecting element.

8. The valve of claim 1, wherein the valve body is normally biased to prevent fluid communication between the channel of the valve housing and the inner bore of the double-walled connecting element.

9. The valve of claim 8, further comprising a solenoid disposed around the valve housing, the solenoid being selectively activated to move the valve body in order to allow the channel of the valve housing to fluidly communicate with the inner bore of the double-walled connecting element.

10. internal combustion engine comprising:
a cylinder;
a fuel inlet valve configured to supply a gaseous fuel to the cylinder; and
a fuel supply system comprising:
  a double-walled fuel supply element comprising an outer line element and an inner line element enclosed within the outer line element, wherein the inner line element is configured to receive the gaseous fuel;
  a double-walled connecting element disposed adjacent to the double-walled fuel supply element, the double-walled connecting element comprising an inner bore in fluid communication with the inner line element of the double-walled fuel supply element and a detection space in fluid communication with an outer line element of the double-walled connecting element, wherein the inner bore is further in fluid communication with the fuel inlet valve; and
  an inert gas supply line in fluid communication with the detection space of the double-walled connecting element; and
a valve, comprising:
  a valve housing defining a channel therethrough in fluid communication with the inert gas supply line at a first end of the valve housing, the valve housing further comprising a first flange disposed at a second end thereof, the second end being distal to the first end;
  a valve body movably disposed within the channel of the valve housing, the valve body configured to selectively allow the channel of the valve housing to communicate with the inner bore of the double-walled connecting element; and
  a second flange disposed adjacent to the first flange, wherein the first flange and the second flange are coupled to the double-walled connecting element, and wherein the second flange comprises a passage therethrough in fluid communication with the detection space of the double-walled connecting element, wherein the first flange and the second flange define a detection gap therebetween, and wherein the passage of the second flange is in fluid communication with the detection gap.

11. The internal combustion engine of claim 10, wherein the first flange further comprises an axial portion extending into the inner bore of the double-walled connecting element, and wherein the axial portion is at least partly received within a central opening of the second flange.

12. The internal combustion engine of claim 11, wherein the detection gap radially extends from an outer surface of the axial portion to the passage of the second flange.

13. The internal combustion engine of claim 11, further comprising a first sealing member provided between the first flange and the second flange radially outwards of the passage of the second flange.

14. The internal combustion engine of claim 10, further comprising a second sealing member provided between the outer surface of the axial portion and the second flange.

15. The internal combustion engine of claim 10, further comprising a third sealing member between the second flange and an inner wall element of the double-walled connecting element.

16. The internal combustion engine of claim 10, further comprising a fastener configured to pass through corresponding holes of the first flange and second flange to couple the first flange and the second flange to the double-walled connecting element.

17. The internal combustion engine of claim 10, wherein the valve body is normally biased to prevent fluid communication between the channel of the valve housing and the inner bore of the double-walled connecting element.

18. The internal combustion engine of claim 10, further comprising a solenoid disposed around the valve housing, the solenoid being selectively activated to move the valve body in order to allow the channel of the valve housing to fluidly communicate with the inner bore of the double-walled connecting element.

19. The internal combustion engine of claim 10, further including an inert gas supply system including:
a change over valve configured to allow the inert gas supply line; and
a suction device configured to create a negative pressure in the inert gas supply line.

20. The internal combustion engine of claim 19, further including a controller configured to actuate the change over valve.

* * * * *

UNITED STATES PATENT AND TRADEMARK OFFICE
CERTIFICATE OF CORRECTION

Page 1 of 1

PATENT NO. : 9,441,596 B2
APPLICATION NO. : 14/718698
DATED : September 13, 2016
INVENTOR(S) : Bleyer et al.

It is certified that error appears in the above-identified patent and that said Letters Patent is hereby corrected as shown below:

In the Claims

Column 9, Line 32, In Claim 10, delete "internal combustion engine comprising:" and insert -- An internal combustion engine comprising: --.

Signed and Sealed this
Third Day of January, 2017

Michelle K. Lee
*Director of the United States Patent and Trademark Office*